(12) United States Patent
Spallek et al.

(10) Patent No.: US 7,758,936 B2
(45) Date of Patent: Jul. 20, 2010

(54) PHARMACEUTICAL BLISTER

(75) Inventors: Michael Spallek, Ingelheim (DE);
Burkhard Metzger, Ingelheim (DE)

(73) Assignee: Boehringer Ingelheim GmbH,
Ingelheim am Rhein (DE)

( * ) Notice: Subject to any disclaimer, the term of this patent is extended or adjusted under 35 U.S.C. 154(b) by 421 days.

(21) Appl. No.: 10/940,291

(22) Filed: Sep. 14, 2004

(65) Prior Publication Data

US 2005/0061705 A1 Mar. 24, 2005

Related U.S. Application Data

(60) Provisional application No. 60/517,313, filed on Nov. 4, 2003.

(30) Foreign Application Priority Data

Sep. 18, 2003 (DE) .............................. 103 43 668

(51) Int. Cl.
*B65D 83/00* (2006.01)
*B65D 83/04* (2006.01)
(52) U.S. Cl. .................... 428/34.2; 206/528; 206/531; 206/534; 206/538; 428/34.1
(58) Field of Classification Search ................. 428/34.2, 428/34.1; 206/531, 528, 534, 538
See application file for complete search history.

(56) References Cited

U.S. PATENT DOCUMENTS 5,112,673 A * 5/1992 Sawada et al. ............... 428/216
5,150,793 A 9/1992 Tannenbaum
5,154,943 A 10/1992 Etzkorn
5,244,091 A 9/1993 Tannenbaum
5,624,036 A 4/1997 Roulin et al.
5,641,559 A * 6/1997 Namiki ........................ 428/216
6,010,784 A 1/2000 Peterson
6,123,991 A * 9/2000 Spallek et al. ............ 427/248.1
6,375,956 B1 * 4/2002 Hermelin et al. ............ 424/400
7,115,310 B2 * 10/2006 Jaccoud ....................... 428/35.7

FOREIGN PATENT DOCUMENTS

DE 40 08 505 C1 7/1991
JP 11-348171 A * 12/1999
JP 2000313474 11/2000

OTHER PUBLICATIONS

English translation of JP 11-348171 A (Mikami et al.).*
WPIDS No. 2001-084677 [10]—JP 2000 313474 Abstract.
M. Walther, M. Heming & m. Spallek, Multilayer barrier coating system produced by plasma-impulse chemical vapor deposition (PICVD), Surface and Coating Technology 80 (1996) 200-202, Elsevier Science S.A.

* cited by examiner

*Primary Examiner*—Brent T O'Hern
(74) *Attorney, Agent, or Firm*—Michael P. Morris; Mary-Ellen M. Devlin; David L. Kershner

(57) ABSTRACT

The present invention relates to a new pharmaceutical blister with reduced permeability to water vapor and gas. It is proposed according to the invention to coat conventional blisters with a silicon oxide-containing functional layer to protect against gases, water vapor and organic molecules.

7 Claims, 2 Drawing Sheets

PHARMACEUTICAL BLISTER

Figure 1:
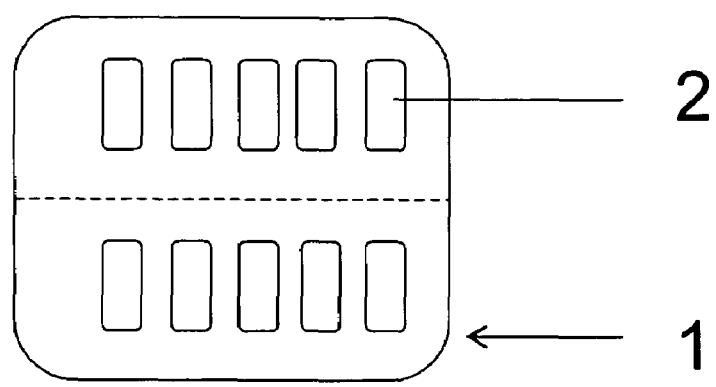

The present invention relates to a new pharmaceutical blister with reduced permeability to water vapor and gas. The invention proposes coating conventional blisters with a functional layer containing silicon oxide and carbon to protect against gases, water vapor and organic molecules.

PRIOR ART

Pharmaceutical blisters as packaging for pharmaceutical formulations serve to package tablets, capsules or other forms of pharmaceuticals safely and protect them from external environmental influences which might in certain circumstances affect the pharmaceutical quality of the formulations. In this context, water or water vapor should be mentioned in particular. If water penetrates into the interior of a blister it may cause lasting changes to the pharmaceutical quality of the drug stored therein. There is also the danger that volatile substances will diffuse out of the material contained in the blister during storage and thereby alter the pharmaceutical formulation. In addition, the blisters must be so designed that the atmospheric conditions inside them remain constant, e.g., in respect of inhalable preparations, so as not to alter their particle size distribution.

Typical blisters consist of at least two films or foils which in turn may be made up of a number of layers of different or identical materials. On the one hand there is the base layer or base foil and on the other hand there is a cover layer or cover foil.

One or more wells may be formed in the base foil in which the pharmaceutical formulation, e.g., tablet(s), coated tablet(s) or capsule(s) can be placed.

The cover foil is placed on the base foil and attached thereto. The two layers are tightly joined together, e.g., by adhesive bonding, at least at the edges. The foils are generally made from plastics or metal or combinations thereof (so called laminates or composite foils). Other materials such as paper, for example, may also be used, possibly in addition.

Preferred blisters consist of transparent or at least translucent plastics or a base foil of transparent plastics and a cover foil of aluminum. Both foils may be laminates, i.e., they may consist of a number of foils of different materials. The blisters known from the prior art do not necessarily adequately protect a formulation embedded therein from the penetration of substances from outside such as, for example, gases or vapors, particularly oxygen, carbon dioxide, water vapor and solvents, even when they are mechanically intact. Theoretically, these substances may permeate or diffuse through the top side of the blister (cover foil), the underside (base foil) or through the seam between the cover foil and base foil.

To avoid this problem, it is preferable in the prior art to use blisters consisting only of aluminum foils or aluminum foil laminates. However, these blisters are then no longer transparent and make it virtually impossible to inspect the contents of the blister before opening, e.g., after the filling process. Therefore, special plastics with high barrier qualities are used for transparent blisters. In most cases, however, special plastics of this kind have only moderate barrier properties against certain gases, e.g., either against water vapor or against oxygen, which means that this measure is not satisfactory either.

Processes for improving the barrier against unwanted diffusion of substances which are known from other fields of the art, e.g., the chemical modification of plastic surfaces of petrol tanks by sulphonation or fluorination, have not acquired any significance in the packaging of pharmaceutical compositions as extensive toxicity and stability tests are required. The prior art also discloses laminate films coated with $SiO_x$ but because of the rigid layer of $SiO_x$ these foils are unable to deform, which means that it is impossible to form wells in order to produce a blister.

In order to achieve a broad barrier effect against gases, water vapor and organic solvents in the case of rigid plastics containers, it is known to provide the plastics container with a coating of special organic and inorganic materials. In this context reference is made to the article "Multilayer Barrier Coating System Produced by Plasma-impulse Chemical Vapor Deposition (PICVD)," M. Walther, M. Heming, M. Spallek, Surface and Coatings Technology 80 (1996), pp. 200-202, which discloses rigid plastics containers having a layer of $SiO_xC_yH_z$ or $TiO_xC_yH_z$ as barrier layer. The coating is done by the PICVD process (plasma impulse chemical vapor deposition) which is known for example from DE 40 08 405 C1 and U.S. Pat. No. 5,154,943.

Up till now there have been no known comparable processes for pharmaceutical blisters.

DESCRIPTION OF THE INVENTION

An aim of the invention is therefore to provide a transparent, flexible, sealable blister
1) with improved protection against gas and moisture exchange between the inside of the blister and the outer environment,
2) with sufficient transparency/translucency for visual inspection and
3) sufficient mechanical stability so as not to peel off when the blister is bent or used.

The disadvantages known from the prior art should also be eliminated.

DETAILED DESCRIPTION OF THE INVENTION

It is proposed according to the invention to coat the base and/or cover foil of a pharmaceutical blister consisting of plastics with an additional functional layer containing silicon oxide and carbon, so as to reduce the above-mentioned gas permeability of the actual blister.

If a foil of the blister (preferably the cover foil) consists of aluminum, it is sufficient to coat the preferably transparent or translucent plastics foil (preferably the base foil, as plastics foils can be more easily deformed than metal foils).

The blister material used for the plastics foils may be PVC (polyvinyl chloride), COP (cycloolefin polymer, CZ®), COC (cycloolefin copolymer e.g., Topas®), polychlorotrifluoroethylene (e.g., ACLAR®), polyethylene (e.g., in the form of high density polyethylene or low density polyethylene), polypropylene, PET (polyethylene terephthalate) and the modifications thereof, polybutene and polymethylpentene, polycarbonates, polyesters, polyacrylates, polyamides or other plastics.

A foil may consist of several layers of the same material or of two or more layers of different materials (laminates).

A blister may consist of several foils of the same material or two or more layers of different materials.

Typically, the blister according to the invention consists of a planar cover foil made of aluminum which seals off the deformed (deep-drawn) plastics foil in order to accommodate the pharmaceutical formulation. This (deep-drawn) foil (base foil) is also referred to in the present context as the well foil, as wells or depressions for accommodating the pharmaceutical formulation are typically formed in the foil. Underneath the (deep-drawn) foil for accommodating the pharmaceutical product an aluminum foil may also be formed as an additional foil to prevent water from penetrating through the foil into the (deep-drawn) foil for accommodating the pharmaceutical product and thereby to minimize the contact of the pharmaceutical formulation with water or to protect it from light. The two aluminum foils may in turn be covered by additional layers of plastics and/or paper so as to impart increased mechanical stability to the blister or make printing easier. According to the invention, the functional layer according to the invention may be applied to any of the above-mentioned plastics foils.

Preferably, the functional layer is applied to one of the foils located close to the pharmaceutical composition if this option is available. Preferably, on the side nearest the foil adjacent to the pharmaceutical composition. In order that the functional layer is not in direct contact with the pharmaceutical product another cover layer may be applied to the functional layer. The functional layer is preferably applied after the deformation of the base foil, i.e., after the shaping of the wells.

In this way it is possible to adapt the material of the blister to the particular contents and the materials for the functional layer to the well geometry required, the barrier effect, transparency and mechanical stability.

The blister having at least one plastics film coated according to the invention is then produced as known in the art. This means that the wells in the base foil are filled with the formulation, then all the foils are put into position above or below one another and the individual foils are then welded or glued together. The bonding material used may be, for example, a heat-sealing lacquer, e.g., based on a polyacrylate and/or polyethylene (e.g., high density and/or low density polyethylene) which is typically applied to the cover foil. The functional layer may extend over the entire surface of the corresponding plastics foil of the blister so that part of the functional layer is incorporated in the weld or adhesive seam, or the areas of the plastics foil of the blister which form the weld seam or adhesive joint of the blister are free from the functional layer.

Thanks to the functional layer there is a substantially free choice of plastics material for the blister in order to satisfy other marginal conditions such as, for example, sensitivity to light, color coding, etc.

The silicon oxide-containing functional layer may be applied to all the surfaces of the plastics layers but preferably to the inside of the base layer. The thickness of the functional layer is in the nm range (2-500 nm), depending on the application, especially in the range from 20-500 nm.

The functional layer which contains silicon oxide is preferably a layer the chemical composition of which varies through the thickness of the layer and which contains carbon and/or hydrogen and/or titanium as preferred additional elements.

Preferably, the barrier layer is a carbon-containing silicon oxide layer characterized by the chemical formula $SiO_xC_y$, the values of x,y varying through the layer thickness. The layer may additionally contain hydrogen as an impurity, thereby producing the empirical formula $SiO_xC_yH_z$, while the hydrogen content is kept to a minimum (z tending to 0). Towards the plastics film the layer contains a higher proportion of carbon, C:Si ratio 1:0.5 to 1:5, which merges into Si-richer areas (C:Si up to 1:10) to change back again into areas with a lower Si concentration (C:Si up to 1:0.2).

This latter layer (layer with a very high concentration of carbon) is most preferably sealable and up to a C:Si ratio of 1:0.2 the layers are still sufficiently transparent.

According to the invention, in the simplest case the coated foil is a 2-ply foil comprising 1) $SiO_xC_yH_z$ and 2) a layer lower in carbon, ideally an $SiO_2$ layer. In the $SiO_xC_yH_z$ layer the hydrogen content is kept to a minimum (z tending to 0). The layer with less carbon can also be referred as the $SiO_{x'}C_{y'}H_{z'}$ layer, wherein x' tends to 2, y' tends to 0 and z' tends to 0. However, in the interests of simplicity, this description will refer only to an $SiO_2$ layer.

In another embodiment this sequence of layers is supplemented by an additional layer component $SiO_aC_bH_c$, so that the $SiO_2$ layer is preferably located between this and the $SiO_xC_yH_z$ layer. In this way the mechanical stability of the functional layer, particularly that of the $SiO_2$ layer, during the bending of the blister and the sealability of the functional layer using heat sealing lacquers is improved. The $SiO_aC_bH_c$ layer is of analogous construction to the $SiO_xC_yH_z$ layer, while the value a may differ slightly from the value x, i.e., they are not necessarily identical but are of a similar order of magnitude. The same is true of the analogous pairs of values y and b and z and c. In the $SiO_aC_bH_c$ layer, as well, the hydrogen content is kept to a minimum (c tending to 0). A functional layer of this kind is preferred, resulting in a layer sequence $SiO_xC_yH_z$; $SiO_2$; $SiO_aC_bH_c$. Thus, in a sandwich-like functional layer of this type of construction, the C:Si ratio decreases towards the centre of the layer, ideally until there is a partial $SiO_2$ layer, whereas the two outer layer portions $SiO_xC_yH_z$ and $SiO_aC_bH_c$ have a higher ratio of C to Si. Thanks to this special layer sequence which is preferred according to the invention, on the hand a high barrier function against gases and vapors is achieved (primarily by means of the low-carbon inner partial layer) while the two outer layers $SiO_xC_yH_z$ and $SiO_aC_bH_c$ ensure good bonding or sealing properties of the functional layer.

Thus, the functional layer is able to perform the desired barrier function, while the area which has a high Si content, i.e., the area with a low ratio of C to Si, chiefly takes on the barrier function.

As already indicated, in practice it is preferable not to have a 2- or 3-layered sequence with partial layers which are sharply defined from one another, but rather the individual layers merge into one another. A layer sequence of this kind may also be referred to as a multi-gradient layer.

In alternative embodiments, Ti may be used in individual layers instead of or in addition to Si. Analogously, the $SiO_xC_yH_z$, and/or $SiO_2$ and/or $SiO_aC_bH_c$ layer may be partly or totally exchanged for a $TiO_xC_yH_z$ or $TiO_2$ or $TiO_aC_bH_c$ layer or such a layer may be additionally incorporated.

According to the invention the functional layer is preferably applied by the PICVD method (Plasma Impulse Chemical Vapor Deposition) or by the PECVD process (Plasma Enhanced Chemical Vapor Deposition). This process surprisingly ensures sufficiently uniform coating of the surface of the blister foil or foils, particularly the well or deep-drawn foil which has a highly complex geometry per se because of the number of cavities. The process is preferably a CVD process that is preferably assisted by a downstream plasma.

The coating of the blister foils with a silicon oxide-containing functional layer of the sequence $SiO_xC_yH_z$; $SiO_2$ and optionally $SiO_aC_bH_c$, with or without Si being replaced by Ti, may be carried out analogously to the process known from the prior art. In connection with this we refer to the article "Multilayer Barrier Coating System Produced by Plasma-impulse Chemical Vapor Deposition (PICVD)," M. Walther, M. Hemming, M. Spallek, Surface and Coatings Technology 80 (1996), pp. 200-202, which is incorporated herein in its entirety. We also refer to DE 40 08 405 C1 and U.S. Pat. No. 5,154,943, which are incorporated herein in their entirety.

The functional layer may alternatively be applied by sputtering. Again, reference is made here to the prior art. Preferably, however, the coating is done by the PICVD method with a linear plasma source and continuous flow.

The principle of coating by the PICVD method can be described as follows. The blister foil which is to be coated is placed in a vacuum chamber. Preferably, the surface of the blister foil that is to be coated is warm, for example, from being previously deformed or shaped. The air may be removed from the vacuum chamber which serves as a reaction chamber by means of a vacuum pump, e.g., to a pressure of 0.3 mbar. Above the vacuum chamber and separated by a microwave window is a horn microwave antenna. Microwave radiation is pulsed into the vacuum chamber through this microwave antenna. A microwave plasma is thus formed inside the vacuum chamber. The duration of the pulses is an additional parameter which influences the composition of the layer deposited.

The microwave pulses, whose duration is in the range from 0.1 to 10 ms, are generated by a microwave generator which is connected to the microwave antenna via a magnetron. The microwave arrangement typically has standard components of the 2.45 GHz technology.

Both the gas in which a plasma arc is ignited, typically oxygen and inert gases (e.g., nitrogen, argon, helium, hydrogen), and also the gas needed for producing the coating, the reaction gas, are introduced through one or more gas supply arrangements. Typically, the layers of $SiO_xC_yH_z$, or $TiO_xC_yH_z$ etc. may be built up by means of organometallic reaction gases such as hexamethyl disiloxane (HMDSO) or titanium tetraisopropoxide (TIPT), by selecting a suitable pulse duration.

First of all the mixture of oxygen and the reaction gas is introduced into the vacuum chamber by means of a feed arrangement. Then, by means of a microwave pulse, a plasma in the vacuum chamber is ignited, cleaving the molecules of the reaction gas. The crack products thus formed diffuse to the nearest surface, i.e., the blister foil and gradually build up the first part of the desired barrier layer. In the interval between pulses before the next pulse is ignited, which is of the order of 100 ms, the spent reaction gases are eliminated from the vacuum chamber by suction in the manner of a 2-stroke engine and replaced by fresh reaction gas and oxygen.

In order to produce a multiple layer, as soon as the first partial layer of $SiO_xC_yH_z$ has been achieved, the corresponding reaction gas—in this case hexamethyl disiloxane (HMDSO)—is replaced by the reaction gas needed to produce the next partial layer, or the ratio of reaction gas to oxygen is altered or corrected by the plasma temperature. In order to produce a smooth transition between these partial layers, a mixture of the two reaction gases may be fed in for a certain length of time, for example. For smooth transitions the proportion of the first reaction gas can be reduced and at the same time the proportion of the second reaction gas can be steadily increased up to the desired value.

If the functional layer is also to contain titanium (Ti), titanium tetraisopropoxide (TIPT) may be used as the reaction gas, for example.

The light of the plasma is also used to reduce the bacterial count in the blister contents.

The pharmaceutical blister according to the invention will now be described in more detail with reference to the figures.

FIG. 1 shows a typical blister (1) within the scope of the present invention having a plurality of wells, cavities, depressions (2), viewed from above.

Figure 2:
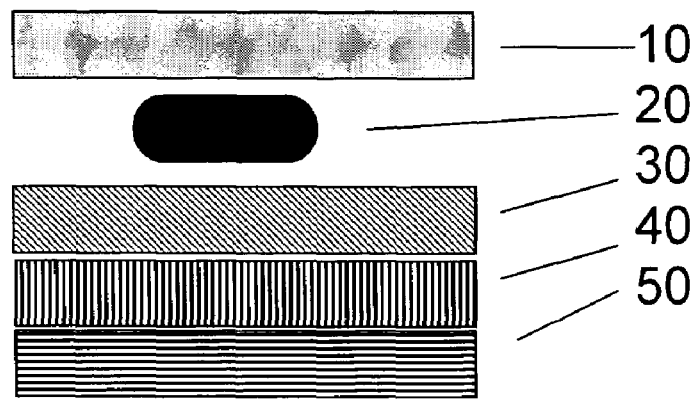

FIG. 2 diagrammatically shows the principle of the invention in simplified form (without any wells or depressions). A cover foil (10) of aluminum covers the pharmaceutical capsule (20), this foil being applied downwards from the functional layer (30) onto a PVC (40)-Aclar (50) composite film.

Figure 3:
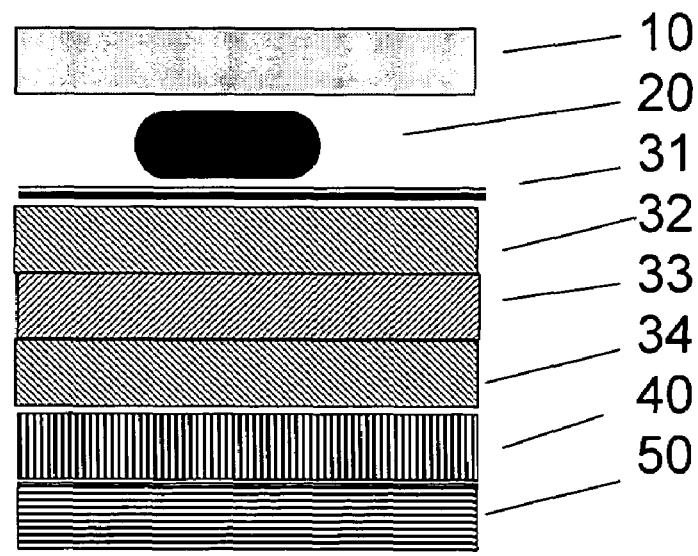

FIG. 3 diagrammatically shows the principle of the invention in a more complex embodiment. In this instance the functional layer is of more complex construction. The pharmaceutical capsule (20) is protected from the functional layer by a sealing layer (31). The functional layer consists of three other layers, namely an $SiO_aC_bH_c$ layer (32), an $SiO_2$ layer (33) and an $SiO_xC_yH_z$ layer (34), applied to the transparent PVC (40)-Aclar (50) composite film.

Figure 4:
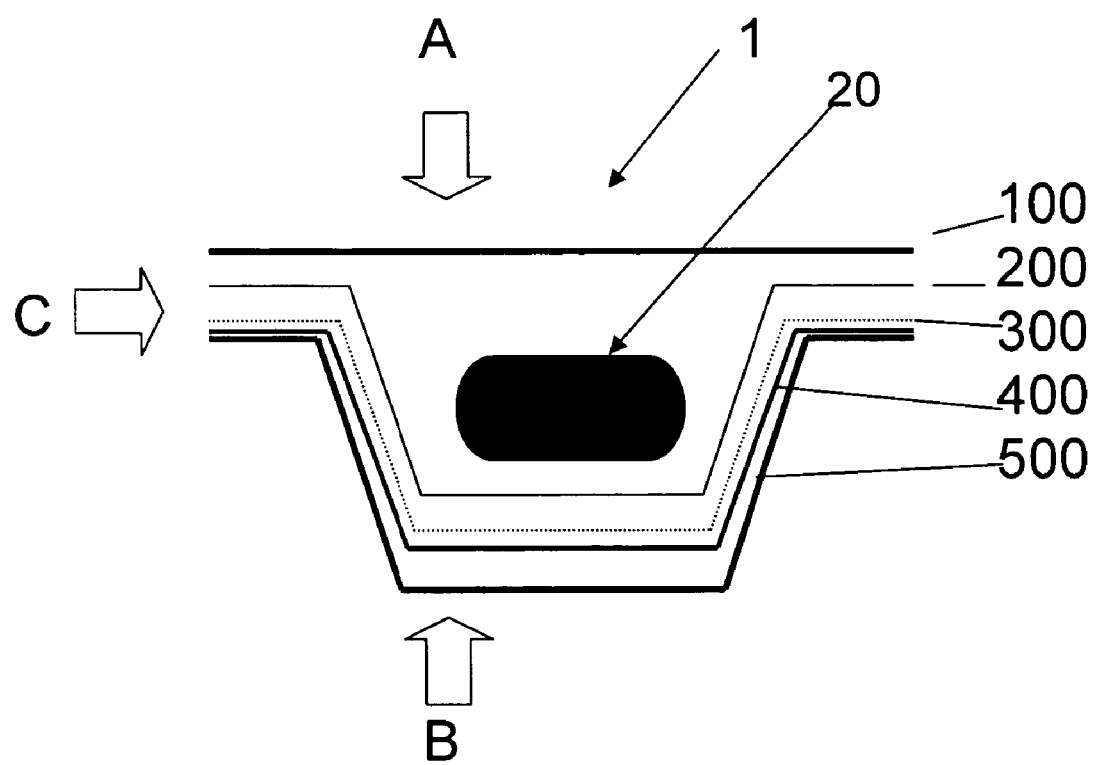

FIG. 4 shows a cross section through blister (1), showing only one well (2). The blister consists of a cover foil (100) made of aluminum, then, for example, a deep-drawn foil with a plurality of layers (200, 300, 400, 500), which are not connected to one another, for accommodating the pharmaceutical product (20), a lower well foil (400) with a barrier layer (300) and the protective coating (500) around the lower well foil (400).

Arrows A indicate the cover layer (100) and are intended to represent the route of diffusion of moisture through the cover layer.

The arrows B indicate the base layer (200, 300, 400, 500) and are intended to represent the route of diffusion of moisture through the base layer.

The arrow C indicates the connecting point between the cover foil and base foil and the route which moisture can take through this part of the blister.

Each of the layers, particularly the layers 400 or 500, may be coated with the barrier coating according to the invention.

Within the scope of the present invention, blisters having the following sequence of layers are preferred:

A cover foil consisting of a first cover foil (i.e., outermost cover foil) made of paper (20 to 100 g/m2) or lacquer (0.5 to 3 g/m2), a second cover layer located below it, consisting of polyethylene terephthalate, preferably with a thickness of 5 to 20 microns, more preferably 10 to 15 microns, and finally a layer of aluminum foil with a preferred thickness of 10 to 60 microns, preferably 10 to 50 microns and most preferably 15 to 40 microns.

Below this is arranged the foil for accommodating the pharmaceutical products, which is formed for example from a 4-ply foil with a preferred thickness of 30 to 500 microns, most preferably 60 to 300 microns. This foil consists initially of a functional layer preferably 20 to 500 nm thick which is sealed off from the pharmaceutical product and which is applied, on the side in contact with the product, to a PVC film the thickness of which is preferably 10 to 200 microns, more preferably 35 to 70 microns, and then an aluminum foil with a thickness of preferably 30 to 60 microns, most preferably 35 to 50 microns. This aluminum layer is in turn covered with a layer of polyamide with a preferred thickness of 10 to 40 microns, more preferably 20 to 30 microns.

Individual layers such as the layer of paper, for example, may be omitted. Any heat sealing lacquers or adhesion promoters needed are not mentioned here in the interests of simplicity.

The most preferred blister consists of two foils, first of all a cover foil consisting of an aluminum composite foil (preferred thickness 38 microns) then a base foil made of PVC (preferred thickness 250 microns), with a silicon oxide-containing functional layer (preferred thickness 20 to 500 nm) applied on the side next to the drug. According to the invention these foils may be welded together so that the aluminum foil is welded or adhesively bonded on the side of the plastics film which carries the functional layer according to the invention. Preferably the aluminum foil is welded or adhesively bonded to the plastics film via the functional layer. Alternatively, the areas of the plastics film of the blister which form the weld or adhesive seam of the blister may be free from the functional layer, so that the functional layer does not extend into the weld or adhesive seam.

What is claimed is:

1. A blister pack comprising:
a substantially planar cover foil comprising a layer of aluminum; and
a base foil comprising a flexible, translucent, vapor barrier layer consisting essentially of a carbon-containing oxide having the formula:

$$MO_xC_yH_z$$

wherein M is silicon or titanium, O is oxygen, C is carbon, H is hydrogen, x is an integer and $x \geq 1$, y is an integer and $y \geq 1$, and z is an integer and $z \geq 0$, and wherein the flexible barrier layer has a thickness of about 100 to 500 nm.

2. The blister pack of claim 1, wherein the base foil further comprises a polyvinylchloride film and the flexible, translucent, vapor barrier layer is applied to an inside of the polyvinylchloride film.

3. The blister pack of claim 2, wherein the cover foil further comprises a first, outermost cover layer of paper or lacquer, and a second cover layer of polyethylene terephthalate, the layer of aluminum being a third, innermost layer, and
wherein the base foil further comprises an aluminum layer and a polyamide layer, an outside of the polyvinylchloride film being applied to an inside of the aluminum layer, and an outside of the aluminum layer being applied to an inside of the polyamide layer.

4. The blister pack of claim 3, wherein the second cover layer of polyethylene terephthalate has a thickness of about 5 to about 20 microns, the third, innermost cover layer of aluminum has a thickness of about 10 to about 60 microns, the polyvinylchloride film has a thickness of about 10 to about 200 microns, the aluminum layer in the base foil has a thickness of about 30 to about 60 microns, and the polyamide layer has a thickness of about 10 to about 40 microns, whereby the deformed base foil has a thickness of about 30 to about 500 microns.

5. A blister pack comprising:
a layer comprising a flexible, translucent, vapor barrier layer consisting essentially of a carbon-containing oxide having the formula:

$$SiO_xC_yH_z$$

wherein Si is silicon, O is oxygen, C is carbon, H is hydrogen, x is an integer and $x \geq 1$, y is an integer and $y \geq 1$, and z is an integer and $z \geq 0$;
a layer comprising $SiO_2$;
a layer comprising a flexible, translucent, vapor barrier layer consisting essentially of a carbon-containing oxide having the formula:

$$SiO_aC_bH_c$$

wherein Si is silicon, O is oxygen, C is carbon, H is hydrogen, a is an integer and $a \geq 1$, b is an integer and $b \geq 1$, and c is an integer and $c \geq 0$; and
wherein the $SiO_2$ layer is located between the $SiO_xC_yH_z$ layer and the $SiO_aC_bH_c$ layer.

6. The blister pack of claim 5, wherein the blister pack further comprises a planar cover foil comprising a layer of aluminum.

7. A blister pack comprising:
a substantially planar cover foil comprising a layer of aluminum; and
a base foil comprising a flexible, translucent, vapor barrier layer consisting essentially of a carbon-containing oxide having the formula:

$$MO_xC_yH_z$$

wherein M is silicon or titanium, O is oxygen, C is carbon, H is hydrogen, x is an integer and $x \geq 1$, y is an integer and $y \geq 1$, and z is an integer and $z \geq 0$, and wherein the flexible barrier layer has a thickness of about 100 to 500 nm.

* * * * *